(12) United States Patent
Hawkinson et al.

(10) Patent No.: US 8,019,542 B2
(45) Date of Patent: Sep. 13, 2011

(54) HEADING STABILIZATION FOR AIDED INERTIAL NAVIGATION SYSTEMS

(75) Inventors: Wesley J. Hawkinson, Chanhassen, MN (US); Tom Rolfer, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 835 days.

(21) Appl. No.: 12/059,837

(22) Filed: Mar. 31, 2008

(65) Prior Publication Data
US 2008/0319667 A1 Dec. 25, 2008

Related U.S. Application Data

(60) Provisional application No. 60/912,026, filed on Apr. 16, 2007.

(51) Int. Cl.
*G01C 21/10* (2006.01)

(52) U.S. Cl. ........................................ 701/220; 701/200

(58) Field of Classification Search .................. 701/200, 701/220–221; 342/357.3
See application file for complete search history.

(56) References Cited

U.S. PATENT DOCUMENTS

| | | | |
|---|---|---|---|
| 4,212,443 A | 7/1980 | Duncan et al. | |
| 4,800,501 A | 1/1989 | Kinsky | |
| 5,421,187 A | 6/1995 | Morgan | |
| 6,152,403 A | 11/2000 | Fowell et al. | |
| 6,209,383 B1 | 4/2001 | Mueller et al. | |
| 6,834,528 B2 | 12/2004 | Kappi et al. | |
| 6,968,281 B2 | 11/2005 | Hanse | |
| 7,275,008 B2 | 9/2007 | Plyvanainen | |
| 7,418,364 B1 * | 8/2008 | Horton et al. | 702/153 |
| 2010/0256907 A1 * | 10/2010 | Bye | 701/221 |
| 2011/0043515 A1 * | 2/2011 | Stathis | 345/419 |

* cited by examiner

*Primary Examiner* — Yonel Beaulieu
(74) *Attorney, Agent, or Firm* — Fogg & Powers LLC (57) ABSTRACT

A method of stabilizing heading in an inertial navigation system includes operating an inertial measurement unit comprising horizontal-sensing elements and off-horizontal-sensing elements while the inertial measurement unit is in a first orientation, calibrating the horizontal-sensing elements of the inertial measurement unit based on horizontal aiding measurements, forward-rotating the inertial measurement unit by a selected-rotation angle about a horizontal-rotation axis so that the inertial measurement unit is oriented in a second orientation, operating the forward-rotated inertial measurement unit while the inertial measurement unit is in the second orientation, and calibrating the rotated off-horizontal-sensing elements based on horizontal aiding measurements while the inertial measurement unit is in the second orientation. When the inertial measurement unit is in the first orientation, the horizontal-sensing elements are oriented in a horizontal reference plane. When the inertial measurement unit is in the second orientation, the off-horizontal-sensing elements are oriented in the horizontal reference plane.

20 Claims, 6 Drawing Sheets

HEADING STABILIZATION FOR AIDED INERTIAL NAVIGATION SYSTEMS

CROSS REFERENCE TO RELATED APPLICATIONS

This application claims the benefit of U.S. Provisional Application No. 60/912,026, filed on Apr. 16, 2007, which is incorporated herein by reference in its entirety.

GOVERNMENT LICENSE RIGHTS

The U.S. Government may have certain rights in the present invention as provided for by the terms of Government Contract # N66001-07-C-2004.

BACKGROUND

Inexpensive inertial navigation systems that are aided by only platform relative horizontal position change or velocity references may not undergo appropriate motions to observe heading drift rate. For example, when a gyroscope in a navigation system of an airborne vehicle is oriented to be sensitive to an axis that is perpendicular to a plane, which is tangential to the point on the earth directly below the gyroscope, and if the altitude of the airborne vehicle is not significantly varying, the heading drift of the gyroscope cannot be corrected by the filters in the inertial navigation system. Over time, the heading drift of the gyroscope results in large position errors in the inertial navigation system. This heading drift can cause the airborne vehicle to go off course.

SUMMARY

The present application discloses a method of stabilizing heading in an inertial navigation system. The method includes the operating an inertial measurement unit comprising horizontal-sensing elements and off-horizontal-sensing elements while the inertial measurement unit is in a first orientation, calibrating the horizontal-sensing elements of the inertial measurement unit based on horizontal aiding measurements, forward-rotating the inertial measurement unit by a selected-rotation angle about a horizontal-rotation axis so that the inertial measurement unit is oriented in a second orientation, operating the forward-rotated inertial measurement unit while the inertial measurement unit is in the second orientation, and calibrating the rotated off-horizontal-sensing elements based on horizontal aiding measurements while the inertial measurement unit is in the second orientation. When the inertial measurement unit is in the first orientation, the horizontal-sensing elements are oriented in a horizontal reference plane. When the inertial measurement unit is in the second orientation, the off-horizontal-sensing elements are oriented in the horizontal reference plane.

This summary is not intended to describe all the embodiments of the present application. It is merely provided as an example of an embodiment and does not limit any claimed embodiment in any manner.

DRAWINGS

In accordance with common practice, the various described features are not drawn to scale but are drawn to emphasize features relevant to the present invention. Like reference characters denote like elements throughout the figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
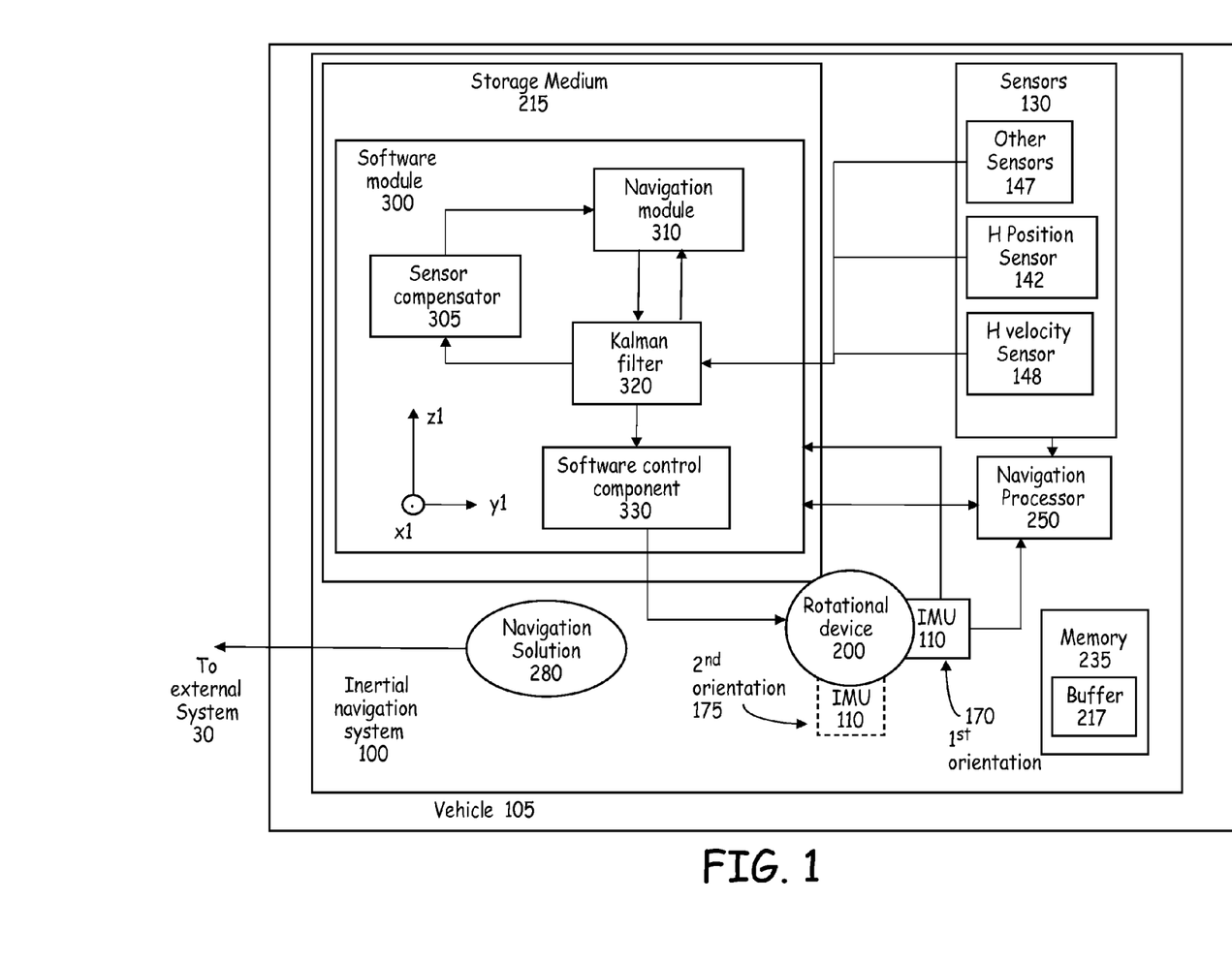
FIG. 1 is a block diagram representative of an inertial navigation system in accordance with the present invention.

FIG. 1 is a block diagram representative of an inertial navigation system 100 in accordance with the present invention. The inertial navigation system 100 shown in a vehicle 105 is an aided inertial navigation system 100 and functions to provide navigation solutions 280 to an external system 30. The inertial navigation system 100 includes an inertial measurement unit (IMU) 110, a rotational device 200, one or more sensors 130, a navigation processor 250, software module 300 stored or otherwise embodied in or on a storage medium 215, and a buffer 217 stored in a memory 235. The inertial measurement unit 110 is a sensor that is shown separately from the sensors 130 to clearly indicate the position of the inertial measurement unit 110 on the rotational device 200.

The inertial measurement unit 110 outputs data (for example, in analog or digital form) that is indicative of one or more physical attributes associated with the inertial navigation system 100. The rotational device 200 is configured to rotate the inertial measurement unit 110 about a horizontal axis $x_1$ from a first orientation 170 to a second orientation 175 (shown in dashed lines). A horizontal reference plane is spanned by the axes ($x_1$, $y_1$). In one implementation of this embodiment, the vehicle 105 travels substantially in the horizontal reference plane ($x_1$, $y_1$). The vehicle 105 can be an airborne vehicle, a land-based vehicle, a water-based vehicle, or an under-water vehicle.

The software module 300 includes a navigation module 310, Kalman filter 320, sensor compensator 305, and software control component 330. The navigation module 310 is configured to receive input from the inertial measurement unit 110. The Kalman filter 320 is communicatively coupled to receive input from the navigation module 310 and the sensors 130 and to send error-correction data to the navigation module 310 and to the sensor compensator 305. The software control component 330 is configured to control the rotation of the rotational device 200 based on input received from the Kalman filter 320. In an alternative implementation of this embodiment, the Kalman filter 320 is replaced by another filter such as a Weiner filter.

The sensors 130 include at least one of a horizontal velocity sensor 148 and a horizontal position sensor 142 that are operable to measure a horizontal velocity and a horizontal position, respectively, of the vehicle 105. The sensors 130 can also include other sensors 147 such as a GPS receiver, an odometer, Doppler radar, or Doppler sonar. The horizontal velocity sensor 148 and the horizontal position sensor 142 are aiding sensors that output the information indicative of a horizontal velocity and a horizontal position, respectively, to the Kalman filter 320. In one implementation of this embodiment, only one of the horizontal velocity reference and the horizontal position reference is provided to the Kalman filter 320.

The Kalman filter 320 does a calibration (also referred to herein as "an alignment") of the inertial measurement unit 110 to compensate for detected errors in the inertial measurement unit 110. The calibration is done periodically, while the inertial measurement unit 110 is in the first orientation 170 and then while the inertial measurement unit 110 is in the second orientation 175. During the calibration, the Kalman filter 320 estimates a bias of the inertial measurement unit 110 and sends the error-correction data to the navigation module 310 and the navigation processor 250.

Figure 7:
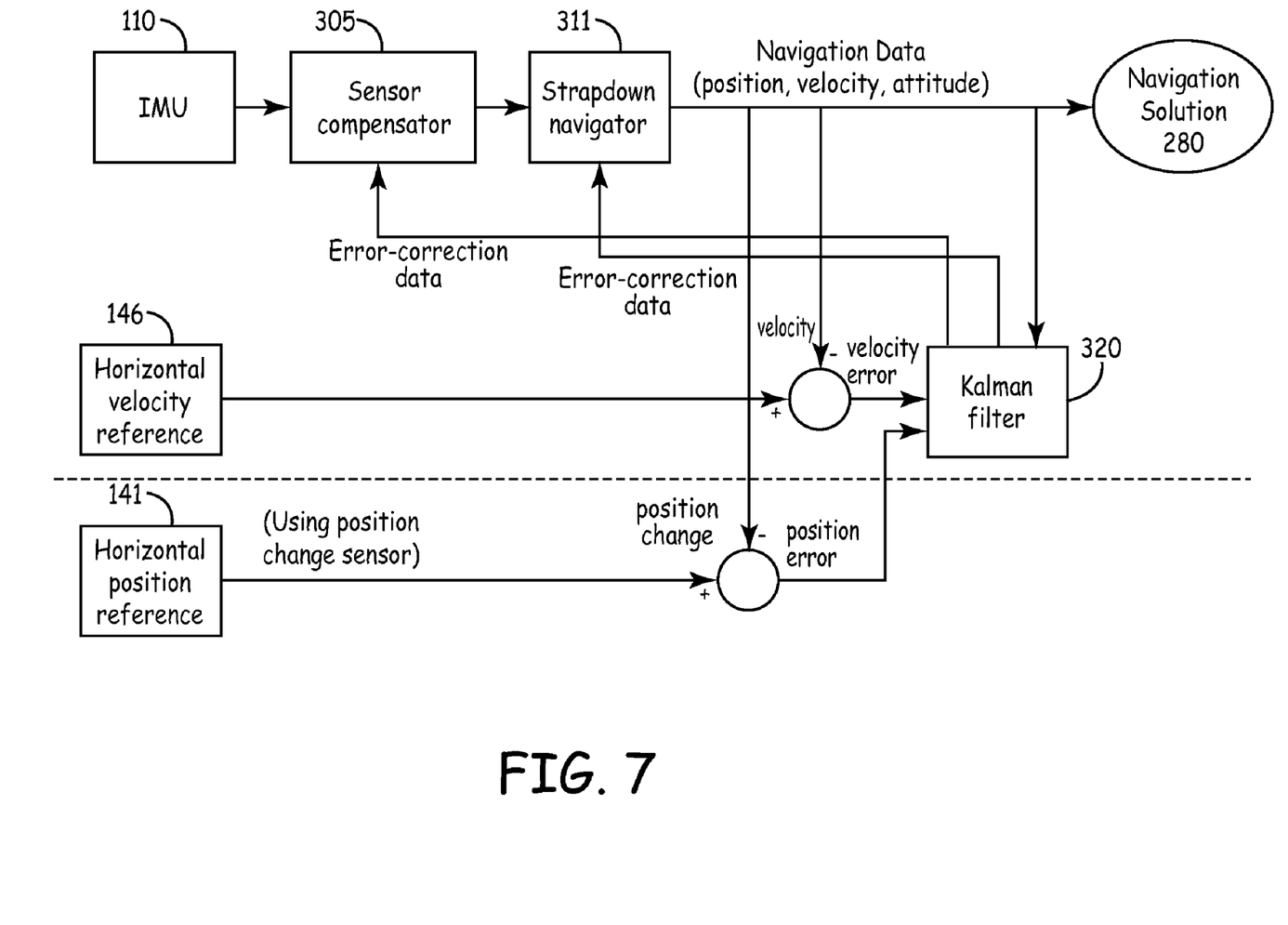
FIG. 7 is a block diagram of the operation of an inertial navigation system during the calibration process.

Navigation module 310 (also referred to herein as "strapdown navigator 311" as shown in FIG. 7) calculates velocity and position based on input received from the inertial measurement unit 110 and sends the information indicative of the velocity and position to the Kalman filter 320. The Kalman filter 320 compares a reference position received from the horizontal position sensor 142 with the calculated position data received from the navigation module 310. The Kalman filter 320 compares a reference velocity received from the horizontal velocity sensor 148 with the calculated velocity data received from the navigation module 310.

If there is a difference between the reference position/velocity and the calculated position/velocity, the Kalman filter 320 determines there is an error in the inertial measurement unit 110 and sends error-correction data to the sensor compensator 305 and the navigation module 310. Specifically, the navigation processor 250 writes the error-correction data generated by the Kalman filter 320 into the buffer 217. The navigation module 310 executing on the navigation processor 250 reads the error-correction data from the buffer 117 during an alignment of the inertial measurement unit 110 to correct the navigation solution 280. A navigation solution 280, corrected for any inertial measurement unit bias, is output from the navigation module 310 to an external system 30 and to the Kalman filter 320.

The Kalman filter 320 also periodically sends control signals to the software control component 330 which is operable to send signals to the rotational device 200 to initiate a rotation of the rotational device 200.

The buffer 217 comprises any suitable form of volatile memory and/or non-volatile memory. In one implementation of this embodiment, the inertial measurement unit 110 and the sensors 130 output data to the navigation processor 250. In another implementation of this embodiment, the horizontal position sensor 142 is a global positioning system receiver. In yet another implementation of this embodiment, the velocity sensor is Doppler radar or Doppler sonar.

Figure 2:
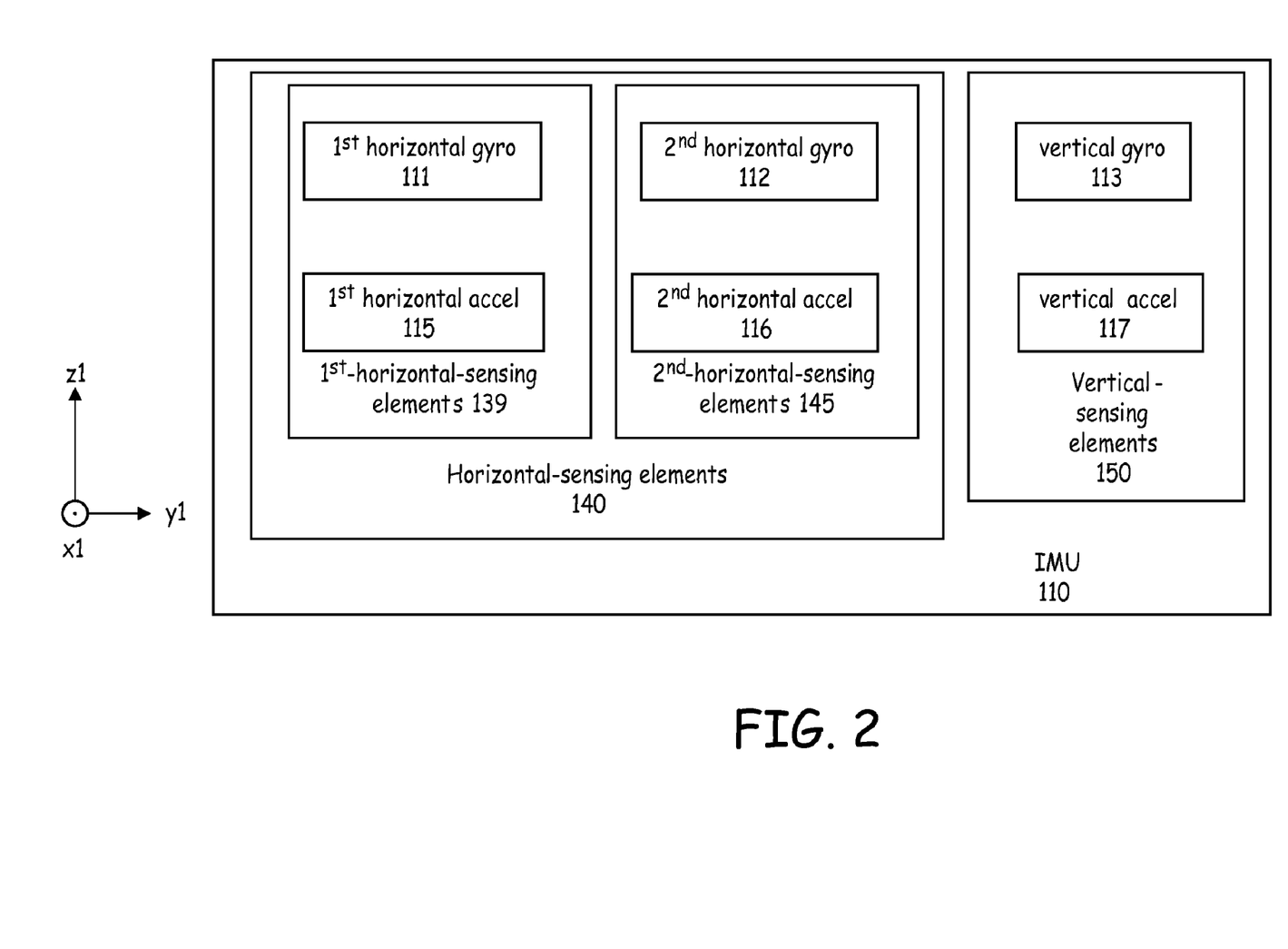
FIG. 2 is a block diagram representative of an inertial measurement unit in accordance with the present invention.

FIG. 2 is a block diagram representative of an inertial measurement unit 110 in accordance with the present invention. As shown in FIGS. 1 and 2, the vertical axis in a first orientation is the axis labeled $z_1$, a first horizontal axis is the axis labeled $y_1$, and a second horizontal axis is the axis labeled $x_1$.

The inertial measurement unit 110 includes a first-horizontal-sensing gyroscope 111, a first-horizontal-sensing accelerometer 115, a second-horizontal-sensing gyroscope 112, a second-horizontal-sensing accelerometer 116, a vertical-sensing gyroscope 113, and a vertical-sensing accelerometer 117. The first-horizontal-sensing gyroscope 111 is also referred to herein as a "horizontal-sensing gyroscope 111," and the first-horizontal-sensing accelerometer 115 is also referred to herein as "horizontal-sensing accelerometer 115."

The vertical-sensing gyroscope 113 and the vertical-sensing accelerometer 117 together form the vertical-sensing elements 150. The vertical-sensing elements 150 are also referred to herein as "off-horizontal-sensing elements 150." In one implementation of this embodiment, the off-horizontal-sensing elements 150 are not perpendicular to the horizontal-sensing elements 140.

The first-horizontal-sensing gyroscope 111 and the first-horizontal-sensing accelerometer 115 together form the first-horizontal-sensing elements 139. The second-horizontal-sensing gyroscope 112 and the second-horizontal-sensing accelerometer 116 together form the second-horizontal-sensing elements 145. The first-horizontal-sensing elements 139 and the second-horizontal-sensing elements 145 together form the horizontal-sensing elements 140. The vertical-sensing elements 150 and the horizontal-sensing elements 140 together form the inertial measurement unit 110. In an alternative implementation of this embodiment, the second-horizontal-sensing elements 145 are not included in the inertial measurement unit 110.

As defined herein, a horizontal-sensing gyroscope is sensitive to rotations about a horizontal axis that lies in a horizontal plane and the horizontal-sensing accelerometer is sensitive to accelerations along the horizontal axis. As defined herein, a vertical-sensing gyroscope is sensitive to rotations about a vertical axis that is perpendicular to the horizontal plane and the vertical-sensing accelerometer is sensitive to accelerations along the vertical axis.

Figure 3:
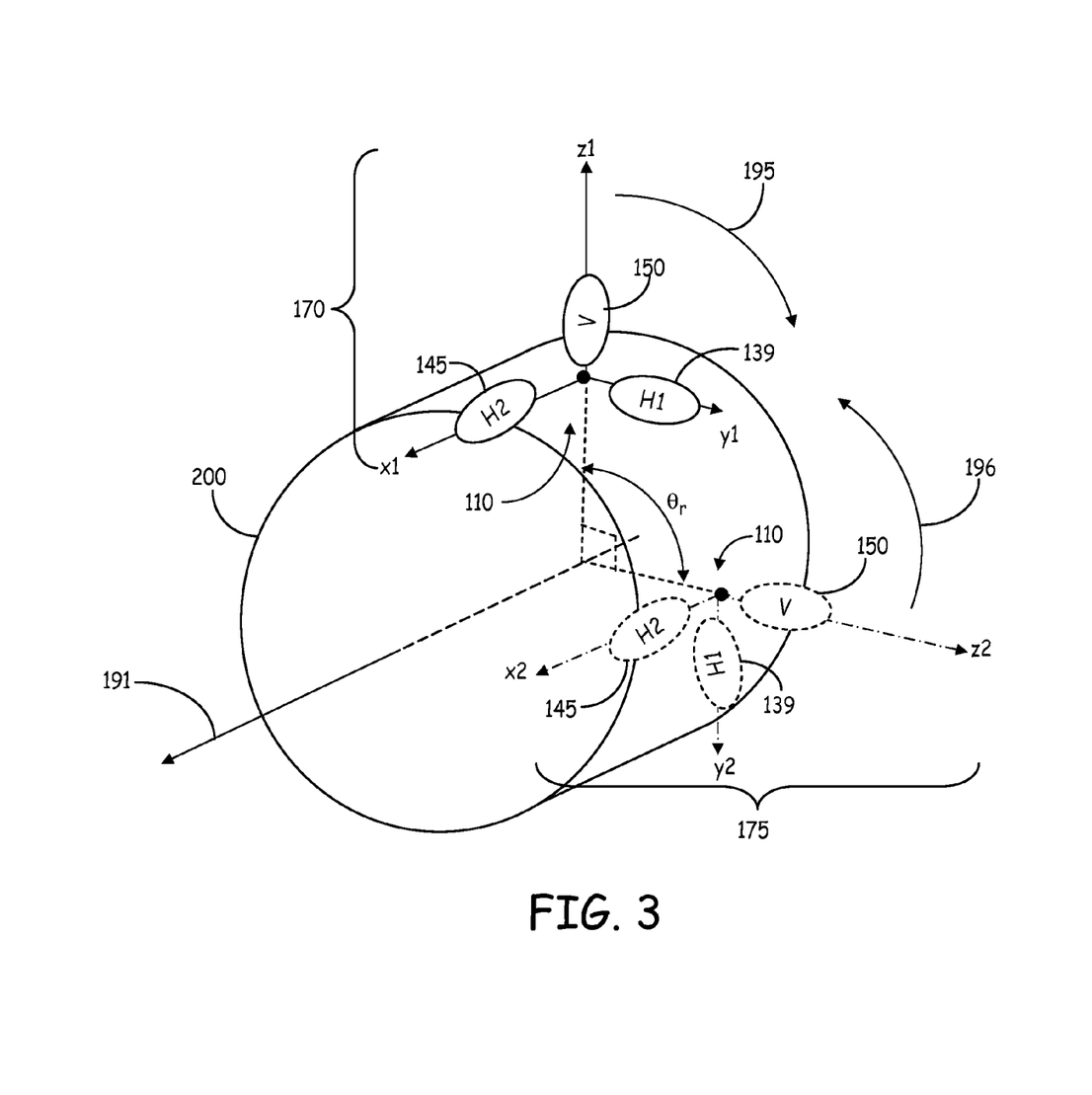
FIG. 3 shows a rotational device on which an inertial measurement unit is positioned in a first orientation and a second orientation in accordance with the present invention.

FIG. 3 shows a rotational device 200 on which the inertial measurement unit 110 is shown positioned in a first orientation 170 and a second orientation 175 in accordance with the present invention. The inertial measurement unit 110 and the axes ($x_2$, $y_2$, $z_2$) in the second orientation 175 are shown in dashed lines to emphasize that the inertial measurement unit 110 is only oriented in one of the first orientation 170 and the second orientation 175 at any given time. During a rotation of the rotational device 200, the inertial measurement unit 110 is located between the first orientation 170 and the second orientation 175. As shown in FIG. 3, the second horizontal axis $x_1$ (FIGS. 1 and 2) is parallel to and offset from a horizontal-rotation axis 191 of the rotational device 200.

In an alternative implementation of this embodiment, the second horizontal axis $x_1$ is parallel to and aligned with the horizontal-rotation axis 191 of a rotational device 200. In this case the inertial measurement unit 110 is positioned inside the rotational device or the rotational device is a structure attached to the inertial measurement unit in a way that permits the rotation of the inertial measurement unit about the horizontal-rotation axis 191 of a rotational device.

When the inertial measurement unit 110 is in the first orientation 170, the first-horizontal-sensing elements 139 are aligned with the first horizontal axis $y_1$, the second-horizontal-sensing elements 145 are aligned with the second horizontal axis $x_1$, and the vertical-sensing elements 150 are aligned with the vertical axis $z_1$.

Figure 4:
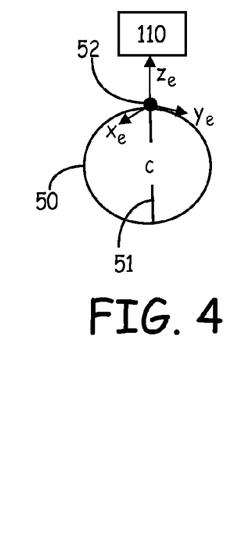
FIG. 4 shows the inertial measurement unit of FIG. 3 with respect to earth-referenced axes in accordance with the present invention.

FIG. 4 shows the inertial measurement unit 110 of FIG. 3 with respect to earth-referenced axes $(x_e, y_e, z_e)$. In one implementation of this embodiment, the horizontal reference plane spanned by the axes $(x_1, y_1)$ (FIG. 3) is parallel to the plane spanned by earth-referenced axes $(x_e, y_e)$. As shown in FIG. 4, the line 51 extending through the center "c" of the earth 50 to the inertial measurement unit 110 intersects the surface of the earth 50 at the point 52. The plane spanned by earth-referenced axes $(x_e, y_e)$ is tangential to the earth at point 52 and is perpendicular to the line 51. Line 51 is parallel to and aligned with the axis $z_e$. As shown in FIG. 4, the axis $x_1$ (FIG. 3) is parallel to the earth-referenced axis $x_e$, the axis $y_1$ (FIG. 3) is parallel to the earth-referenced axis $y_e$, and the inertial measurement unit 110 in a vehicle flying above the earth 50 is intersected by the earth-referenced axis $z_e$. In one such embodiment, the vehicle generally travels within the plane spanned by axes $(x_1, y_1)$ that is parallel to the plane spanned by the axes $(x_e, y_e)$, without significant movement along the $z_1$ (or $z_e$) axis.

If the rotational device 200 is oriented to position the inertial measurement unit 110 in the first orientation 170 and then undergoes a rotation of a selected-rotation angle $\theta_r$ in the direction of a forward rotation 195, the rotational device 200 is then oriented in the second orientation 175. When the inertial measurement unit 110 is in the second orientation 175, the first-horizontal-sensing elements 139 are aligned with the second horizontal axis $y_2$, the second-horizontal-sensing elements 145 are aligned with the second horizontal axis $x_2$, and the vertical-sensing elements 150 are aligned with the axis $z_2$. As shown in FIG. 3, the axis $x_1$ is parallel to and offset from axis $x_2$, the axis $y_1$ is parallel to and offset from axis $z_2$, and axis $z_1$ is anti-parallel to and offset from axis $y_2$. In the embodiment in which the inertial measurement unit 110 is intersected by the earth-referenced axis $z_e$, the axis $y_2$ is parallel to and in the opposite direction of axis $z_e$ and the axis $z_2$ is parallel to and in the same direction as axis $y_e$.

The rotational device 200 then undergoes a rotation of a selected-rotation angle $\theta_r$ in the direction of a back rotation 196, and the rotational device 200 is then re-oriented in the first orientation 170. The rotational device 200 periodically rotates between the first orientation 170 and the second orientation 175. The inertial navigation system 100 (FIG. 1) uses the horizontal aiding measurements to calibrate the first-horizontal-sensing elements 139 and the second-horizontal-sensing elements 145 while the inertial measurement unit 110 is in the first orientation 170 and uses the horizontal aiding measurements to calibrate the vertical-sensing elements 150 and second-horizontal-sensing elements 145 while the inertial measurement unit 110 is in the second orientation 175. In this manner the horizontal velocity reference and/or horizontal position reference are used to calibrate all the sensing elements in the inertial measurement unit 110 along three axes. In one implementation of this embodiment, the three axes are orthogonal to each other.

In one implementation of this embodiment, the selected-rotation angle $\theta_r$ is a 90° rotation so the rotational device 200 is rotated in the forward direction 195 by the selected-rotation angle of 90° and is then back-rotated in the back-direction 196 by a selected-rotation angle of 90°. In another implementation of this embodiment, the rotational device 200 is rotated in the forward direction 195 by a first selected-rotation angle of 90° and is then further rotated in the forward direction 195 by a second selected-rotation angle of 270°.

Figure 5:
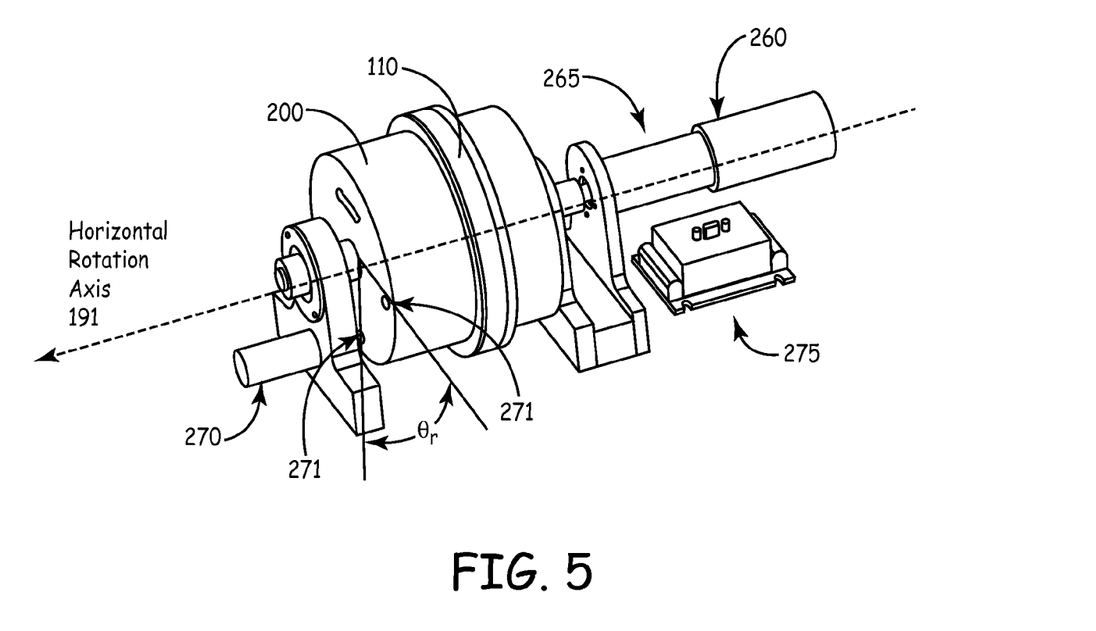
FIG. 5 shows one embodiment of an inertial measurement unit on a rotational device in accordance with the present invention.

FIG. 5 shows one embodiment of an inertial measurement unit 110 on a rotational device 200 in accordance with the present invention. The rotational device 200 is mechanically coupled to a servomotor 260 by a precision gear head 265. The servomotor 260 is an automatic device which provides rotary (angular) control with an error-sensing feedback to correct the performance of the rotational device. The precision gear head 265 is aligned to the horizontal-rotation axis 191 of the rotational device 200. A solenoid 270 is communicatively coupled to the rotational device 200 to control the rotation. In one implementation of this embodiment, indexing pins (not shown) are placed in holes 271 in the rotational device 200 to form a pair of stops to mechanically limit the angular rotation of the precision gear head 256 to a selected-rotation angle $\theta_r$. The inertial measurement unit 110 on an outer surface of the rotational device 200 is rotated between the first orientation and the second orientation responsive to receiving control signals from the software control component in a motor controller 275. In one implementation of this embodiment, the selected-rotation angle $\theta_r$ is a ninety degree rotation.

Figure 6:
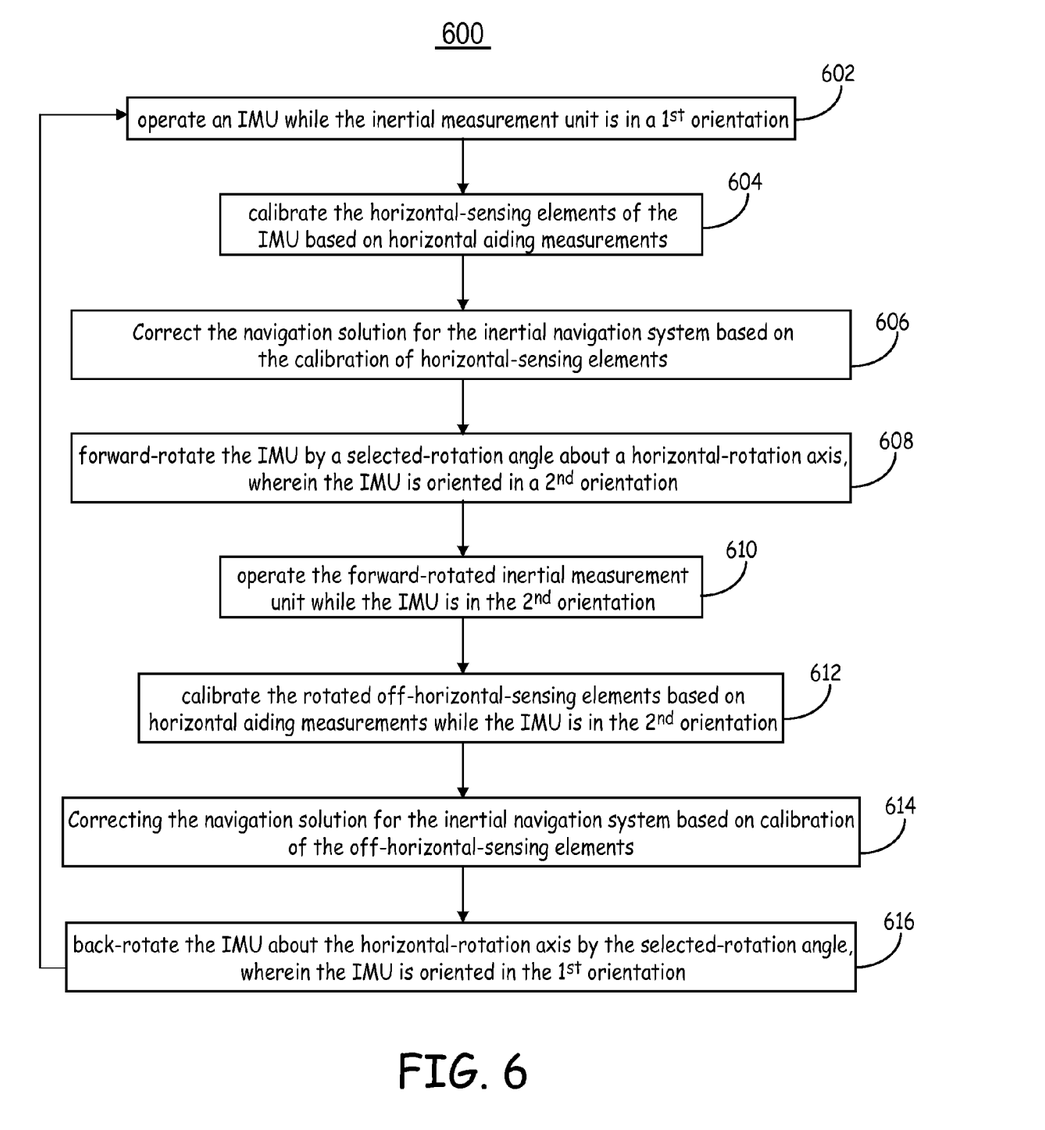
FIG. 6 is a flow diagram of one embodiment of a method to stabilize heading in an inertial navigation system in accordance with the present invention

FIG. 6 is a flow diagram of one embodiment of a method 600 to stabilize heading in an inertial navigation system in accordance with the present invention. The embodiment of method 600 is described as being implemented using the inertial navigation system 100 of FIG. 1. In such an embodiment, at least a portion of the processing of method 600 is performed by software module 300 executed by the navigation processor 250 to perform the processing described here as being carried out by the software module 300. The software module 300 includes program instructions that are stored on, or otherwise embodied on or in, one or more items of storage media 215 (only one of which is shown in FIG. 1). It is to be understood that method 600 can be implemented using other embodiments of the inertial navigation system 100.

At block 602, an inertial measurement unit 110 comprising horizontal-sensing elements 140 and off-horizontal-sensing elements 150 is operated while the inertial measurement unit 110 is in a first orientation 170. When the inertial measurement unit 110 is in the first orientation 170, the horizontal-sensing elements 140 are oriented in a horizontal reference plane, such as $(x_1, y_1)$. The first orientation 170 is also referred to herein as the un-rotated position 170.

The method of operating the inertial measurement unit 110 in a first orientation 170 includes the process of sensing by the horizontal-sensing elements 140 and the off-horizontal-sensing elements 150 (FIG. 2) in the inertial measurement unit 110. The horizontal-sensing gyroscope 111 oriented to be sensitive to a first-horizontal axis $y_1$ (FIG. 3) generates information indicative of a horizontal axis tilt error. In one implementation of this embodiment, the first-horizontal axis $y_1$ is orthogonal to the horizontal-rotation axis 191. The horizontal-sensing accelerometer 115 oriented to be sensitive to the first-horizontal axis $y_1$ generates information indicative of a horizontal velocity. The vertical-sensing gyroscope 113 oriented to be sensitive to a vertical axis $z_1$ generates information indicative of a vertical axis heading. In one implementation of this embodiment, the vertical axis $z_1$ is orthogonal to the horizontal-rotation axis 191 and the first-horizontal axis $y_1$. The vertical-sensing accelerometer 117 oriented to be sensitive to the vertical axis $z_1$ generates information indicative of a vertical velocity.

At block 604, the horizontal-sensing elements 140 of the inertial measurement unit 110 are calibrated based on horizontal aiding measurements. Specifically, the first-horizontal-sensing gyroscope 111 and the first-horizontal-sensing accelerometer 115 are calibrated based on horizontal aiding measurements received at the Kalman filter 320 while the inertial measurement unit 110 is operated in the un-rotated orientation 170. Additionally, the second-horizontal-sensing gyroscope 112 and the second-horizontal-sensing accelerometer 116 are calibrated based on horizontal aiding measurements received while operating the inertial measurement unit 110 in the un-rotated orientation 170. In one implementation of this embodiment, there is no second-horizontal-sensing gyroscope 112 or second-horizontal-sensing accelerometer 116 in the inertial measurement unit 110.

At block 606, the Kalman filter 320 corrects the navigation solution 280 for the inertial navigation system 100 based on the calibrating of the horizontal-sensing elements 140.

FIG. 7 is a block diagram of the operation of the inertial navigation system 100 during the calibration process. The horizontal aiding measurements, which include the horizontal velocity reference 146 and/or the horizontal position reference 141, are received at the Kalman filter 320 from the horizontal position sensor 142 and the horizontal velocity sensor 148 (FIG. 1).

The Kalman filter 320 receives information indicative of the horizontal axis tilt error from the horizontal-sensing elements 140. The Kalman filter 320 receives information indicative of the horizontal axis tilt error from the first-horizontal-sensing gyroscope 111 and the second-horizontal-sensing gyroscope 112. The Kalman filter 320 receives information indicative of the horizontal axis tilt error from the first and second horizontal accelerometers 115 and 116, respectively. The Kalman filter 320 receives information indicative of the vertical axis heading error from the vertical gyroscope 113 The Kalman filter 320 receives information indicative of the vertical velocity from the vertical-sensing accelerometer 117. The inertial measurement unit 110 sends the information indicative of horizontal axis tilt error, vertical axis heading error, horizontal velocity, and vertical velocity to the sensor compensator 305, which is communicatively coupled to the navigation module that is shown as a strapdown navigator 311 in FIG. 7. The strapdown navigator 311 sends the information to the Kalman filter 320.

The Kalman filter 320 estimates a un-rotated-horizontal-axis-position error based on the information received from the inertial measurement unit 110 in the un-rotated orientation 170. The Kalman filter 320 corrects the navigation solution 280 and updates the gyroscope bias estimate at the sensor compensator 305. The sensor compensator 305 updates the data input from the inertial measurement unit 110 and then outputs the updated inertial measurement unit data to the strapdown navigator 311. The strapdown navigator outputs the corrected navigation solution 280 to the Kalman filter and an external system 30 for use by the external system 30.

Returning to FIG. 6, at block 608, the inertial measurement unit 110 is forward-rotated by a selected-rotation angle $\theta_r$ about a horizontal-rotation axis 191. The horizontal-rotation axis 191 is orthogonal to the direction sensed by the horizontal-sensing elements 139 that include the horizontal-sensing gyroscope 111. After the forward rotation, the inertial measurement unit 110 is oriented in the second or rotated orientation 175 (FIGS. 1 and 3). When the inertial measurement unit 110 is in the second orientation 175, the vertical-sensing elements 150 (FIG. 3) are oriented in the horizontal reference plane spanned by the axes $(x_1, y_1)$. The software control component 330 (FIG. 1) sends a forward-rotation control signal to the rotational device 200 to initiate the forward-rotation of the rotational device 200 on which the inertial measurement unit 110 is positioned. In one implementation of this embodiment, the forward-rotation is a plus-ninety degree rotation of a selected axis, such as axis $z_1$, so that the selected axis (axis $z_1$) is rotated ninety degrees in the direction of forward rotation 195 (FIG. 3).

At block 610, the forward-rotated inertial measurement unit 110 is operated while the inertial measurement unit 110 is in the second or rotated orientation 175. The method of operating the inertial measurement unit 110 in the second orientation 175 includes the process of sensing by the horizontal-sensing elements 140 and the off-horizontal-sensing elements 150 (FIG. 2) in the inertial measurement unit 110. The first-horizontal axis $y_1$ is parallel to and offset from the axis $z_2$ at the second orientation 175. The vertical axis $z_1$ is anti-parallel to and offset from the axis $y_2$ at the second orientation 175. The first-horizontal-sensing elements 139 (including the horizontal-sensing gyroscope 111) are now oriented to be sensitive to a vertical axis $y_2$ (FIG. 3) and to generate information indicative of a vertical axis heading error. The vertical-sensing elements 150 (including the vertical-sensing gyroscope 113) are now oriented to be sensitive to axis $z_2$, which lies in the plane $(x_2, z_2)$ that is parallel to the horizontal reference plane spanned by the axes $(x_1, y_1)$.

The vertical-sensing gyroscope 113 oriented to be sensitive to the first-horizontal axis $y_1$, which is parallel to and offset from the axis $z_2$, generates information indicative of the horizontal axis tilt error. The vertical-sensing accelerometer 117 oriented to be sensitive to the first-horizontal axis $y_1$ generates information indicative of the horizontal velocity. The horizontal-sensing gyroscope 111 oriented to be sensitive to the vertical axis $z_1$, which is parallel to and offset from the axis $y_2$, generates information indicative of the vertical axis heading error. The horizontal-sensing accelerometer 115 oriented to be sensitive to the vertical axis $z_1$ generates information indicative of the vertical velocity.

At block 612, the rotated off-horizontal-sensing elements 150 are calibrated based on horizontal aiding measurements while the inertial measurement unit 110 is in the second orientation 175. Specifically, the vertical-sensing gyroscope 113 and the vertical-sensing accelerometer 117 are calibrated based on horizontal aiding measurements received while operating the inertial measurement unit 110 in the rotated orientation 175. Additionally, the second-horizontal-sensing gyroscope 112 and the second-horizontal-sensing accelerometer 116 are calibrated based on horizontal aiding measurements received while operating the inertial measurement unit 110 in the rotated orientation 175.

The calibration of the rotated off-horizontal-sensing elements 150 is described with reference to FIG. 7. As in block 604, the horizontal aiding measurements are received at the Kalman filter 320 from the horizontal position sensor 142 and the horizontal velocity sensor 148 in the sensors 130 (FIG. 1). The Kalman filter 320 receives information indicative of the horizontal axis tilt error from the vertical-sensing gyroscope 113. The Kalman filter 320 receives information indicative of the horizontal velocity from vertical-sensing accelerometer 117. The Kalman filter 320 receives information indicative of the vertical axis heading error and information indicative of the vertical velocity from the first-horizontal-sensing elements 139 in the inertial measurement unit 110 in the rotated orientation.

The Kalman filter 320 estimates a rotated-horizontal-axis-position error based on the information received from the inertial measurement unit 110 in the rotated orientation 175. The Kalman filter 320 estimates a rotated-horizontal-axis-velocity error based on the information received from the inertial measurement unit 110 in the rotated orientation 175.

At block 614, the Kalman filter 320 corrects the navigation solution 280 for the inertial navigation system 100 based on the calibrating of the off-horizontal-sensing elements 150 in the inertial measurement unit. Referring again to FIG. 7, the Kalman filter 320 corrects the navigation solution 280 and updates the gyroscope bias estimate at the sensor compensator 305. The sensor compensator 305 updates the data input from the inertial measurement unit 110 and then outputs the updated inertial measurement unit data to the strapdown navigator 311. The strapdown navigator outputs the corrected navigation solution 280 to the Kalman filter 320 and an external system 30 for use by the external system 30.

In this manner, if the aiding data is taken from one plane and the vehicle 105 carrying the inertial navigation system 100 is moving only within one plane, the vertical-sensing elements 150 and horizontal-sensing elements 140 are all calibrated at blocks 612 and 604, respectively, and the navigation solution 280 is corrected after each calibration at blocks 614 and 606, respectively.

At block 616, the inertial measurement unit 110 is back-rotated about the horizontal-rotation axis 191 by the selected-rotation angle $\theta_r$. The inertial measurement unit 110 is oriented in the first orientation 170 after the inertial measurement unit 110 is back-rotated about the horizontal-rotation axis 191 by the selected-rotation angle $\theta_r$. The software control component 330 (FIG. 1) sends a back-rotation control signal to the rotational device 200 to initiate the back-rotation of the rotational device 200 on which the inertial measurement unit 110 is positioned. In one implementation of this embodiment, the back-rotation is a minus-ninety degree rotation of a selected axis, such as axis $z_1$, so that the selected axis (axis $z_1$) is rotated ninety degrees in the direction of back rotation 196 (FIG. 3).

In an alternative implementation of this embodiment, the inertial measurement unit 110 is further-forward-rotated about the horizontal-rotation axis 191 by a second selected-rotation angle (360°-$\theta_r$), wherein the inertial measurement unit 110 is oriented in the first orientation 170 after the inertial measurement unit 110 is further-forward-rotated about the horizontal-rotation axis 191 by the second selected-rotation angle (360°-$\theta_r$). In one implementation of this embodiment, the selected-rotation angle is 90° and the second selected-rotation angle is 270°. In this case, the software control component 330 (FIG. 1) sends a further-forward-rotation control signal to the rotational device 200 to initiate the further-forward-rotation of the rotational device 200 on which the inertial measurement unit 110 is positioned.

The flow of method 600 proceeds back to block 602 and the inertial measurement unit 110 is operated while the inertial measurement unit 110 is in the first orientation 170. The horizontal-sensing elements 140 of the inertial measurement unit 110 are re-calibrated based on horizontal aiding measurements while the inertial measurement unit 110 is in the first orientation 170. In this manner, the angular drift about the vertical axis (heading drift) is made to be observable and the Kalman filter is able to estimate heading drift, attribute the drift to a specific gyro, calibrate all gyros and correct for position and velocity errors due to vertical angular drift.

Once every Kalman filter cycle, the Kalman filter 320 generates an error estimate for the navigation solution 280 based at least in part on the input data from the inertial measurement unit 110 and the sensors 130. The forward-rotation and back-rotation occur periodically. In one implementation of this embodiment, the inertial measurement unit 110 is periodically forward-rotated through a plus-ninety degree rotation and back-rotated through a minus-ninety degree rotation responsive to each forward rotation. In one implementation of this embodiment, there are more than two Kalman filter cycles during the time the inertial measurement unit is held in the first orientation 170 or the second orientation 175.

The period of the rotation is based on the length of time that the gyroscopes and accelerometers hold the calibrations. In one implementation of this embodiment, the calibration of the gyroscopes and accelerometers holds for ten minutes and the rotational device 200 rotates the inertial measurement unit 110 every ten minutes. In another implementation of this embodiment, the calibration of the gyroscopes and accelerometers holds for thirty seconds and the rotational device 200 rotates the inertial measurement unit 110 every thirty seconds.

The time taken to rotate the inertial measurement unit about the horizontal rotation axis 191 from the un-rotated orientation 170 to the rotated orientation 175 is much less than the period of time between the forward-rotation and the back-rotation. In one implementation of this embodiment, the time taken to rotate the inertial measurement unit about the horizontal rotation axis 191 from the un-rotated orientation 170 to the rotated orientation 175 is about one second.

In one implementation of this embodiment, the method of stabilizing heading in an inertial navigation system is applied to a vehicle that is generally moving in a vertical direction of a vertical plane (e.g., the plane spanned by ($x_1$, $z_1$) or the plane spanned by ($y_1$, $z_1$)), rather than in a horizontal direction of a horizontal plane, and the vehicle is receiving information indicative of vertical velocity reference and/or vertical position reference. An exemplary vehicle that would be making such a motion is an underwater vehicle that is moving between the ocean floor and the surface of the ocean. In this case, the rotation axis would be about a vertical axis (e.g., $z_1$) rather than the horizontal-rotation axis 191 and the Kalman filter 320 compares the data received from the first-horizontal-sensing elements 139 and the second-horizontal-sensing elements 145 as is understandable by one skilled in the art upon reading this document.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of stabilizing heading in an inertial navigation system, the method comprising:

operating an inertial measurement unit comprising horizontal-sensing elements and off-horizontal-sensing elements, while the inertial measurement unit is in a first orientation, wherein the horizontal-sensing elements are oriented in a horizontal reference plane;

calibrating the horizontal-sensing elements of the inertial measurement unit based on horizontal aiding measurements;

forward-rotating the inertial measurement unit by a selected-rotation angle about a horizontal-rotation axis, wherein the inertial measurement unit is oriented in a second orientation, and wherein, while the inertial measurement unit is in the second orientation, the off-horizontal-sensing elements are oriented in the horizontal reference plane;

operating the forward-rotated inertial measurement unit while the inertial measurement unit is in the second orientation; and calibrating the rotated off-horizontal-sensing elements based on horizontal aiding measurements while the inertial measurement unit is in the second orientation.

2. The method of claim 1, further comprising:
back-rotating the inertial measurement unit about the horizontal-rotation axis by the selected-rotation angle, wherein the inertial measurement unit is oriented in the first orientation;
operating the inertial measurement unit while the inertial measurement unit is in the first orientation; and
re-calibrating the horizontal-sensing elements of the inertial measurement unit based on horizontal aiding measurements while the inertial measurement unit is in the first orientation.

3. The method of claim 2, further comprising:
correcting a navigation solution for the inertial navigation system based on the calibrating of the horizontal-sensing elements; and
correcting the navigation solution for the inertial navigation system based on the calibrating of the off-horizontal-sensing elements.

4. The method of claim 1, wherein the off-horizontal-sensing elements are vertical-sensing elements, and wherein the selected-rotation angle is ninety degrees.

5. A method of stabilizing heading in an inertial navigation system, the method comprising:
operating an inertial measurement unit in an un-rotated orientation;
calibrating at least one horizontal-sensing gyroscope and at least one horizontal-sensing accelerometer based on horizontal aiding measurements received while operating the inertial measurement unit in the un-rotated orientation;
forward-rotating the inertial measurement unit about a horizontal-rotation axis, the horizontal-rotation axis being orthogonal to the direction sensed by at least one horizontal-sensing gyroscope;
operating the inertial measurement unit in a rotated orientation; and
calibrating a vertical gyroscope and a vertical-sensing accelerometer based on horizontal aiding measurements received while operating the inertial measurement unit in the rotated orientation.

6. The method of claim 5, further comprising:
back-rotating the inertial measurement unit about the horizontal-rotation axis, wherein the inertial measurement unit is oriented in the un-rotated orientation.

7. The method of claim 6, wherein a forward-rotation is a plus-ninety degree rotation, and wherein a back-rotation is a minus-ninety degree rotation.

8. The method of claim 6, further comprising:
periodically forward-rotating the inertial measurement unit through a plus-ninety degree rotation; and
back-rotating the inertial measurement unit through a minus-ninety degree rotation responsive to each forward rotation.

9. The method of claim 6, wherein operating an inertial measurement unit in the un-rotated orientation comprises:
generating information indicative of a horizontal axis tilt error at the horizontal-sensing gyroscope oriented to be sensitive to a first-horizontal axis, the first-horizontal axis being orthogonal to the horizontal-rotation axis;
generating information indicative of a horizontal velocity at the horizontal-sensing accelerometer oriented to be sensitive to the first-horizontal axis;
generating information indicative of a vertical axis heading error at the vertical-sensing gyroscope oriented to be sensitive to a vertical axis, the vertical axis being orthogonal to the horizontal-rotation axis and the first-horizontal axis; and
generating information indicative of a vertical velocity at the vertical-sensing accelerometer oriented to be sensitive to the vertical axis.

10. The method of claim 9, wherein operating the inertial measurement unit in the rotated orientation comprises:
generating information indicative of the horizontal axis tilt error at the vertical-sensing gyroscope oriented to be sensitive to the first-horizontal axis;
generating information indicative of the horizontal velocity at the vertical-sensing accelerometer oriented to be sensitive to the first-horizontal axis;
generating information indicative of the vertical axis heading error at the horizontal-sensing gyroscope oriented to be sensitive to the vertical axis; and
generating information indicative of the vertical velocity at the horizontal-sensing accelerometer oriented to be sensitive to the vertical axis.

11. The method of claim 10, wherein calibrating the at least one horizontal-sensing gyroscope and the at least one horizontal-sensing accelerometer based on horizontal aiding measurements comprises:
receiving information indicative of the horizontal axis tilt error, the information indicative of the horizontal velocity, the information indicative of the vertical axis heading error, and the information indicative of the vertical velocity from the inertial measurement unit in the un-rotated orientation;
estimating an un-rotated-horizontal-axis-position error based on the information received from the inertial measurement unit in the un-rotated orientation;
estimating an un-rotated-horizontal-axis-velocity error based on the information received from the inertial measurement unit in the un-rotated orientation; and
wherein calibrating the vertical-sensing gyroscope and the vertical-sensing accelerometer based on horizontal aiding measurements comprises:
receiving information indicative of the horizontal axis tilt error, the information indicative of the horizontal velocity, the information indicative of the vertical axis tilt error, and the information indicative of the vertical velocity from the inertial measurement unit in the rotated orientation;
estimating a rotated-horizontal-axis-position error based on the information received from the inertial measurement unit in the rotated orientation; and
estimating a rotated-horizontal-axis-velocity error based on the information received from the inertial measurement unit in the rotated orientation.

12. An inertial navigation system, comprising:
an inertial measurement unit;
rotational device on which the inertial measurement unit is positioned, the rotational device configured to rotate the inertial measurement unit about a horizontal axis from a first orientation to a second orientation;
a software module comprising:
a navigation module configured to receive input from the inertial measurement unit;
a Kalman filter communicatively coupled to the navigation module;
a software control component configured to control the rotation of the rotational device based on input received from the Kalman filter; and
at least one of a velocity sensor and a position sensor operable to measure a velocity and a position, respectively, and further operable to output the information indicative of a velocity and a position to the Kalman filter, respectively; and a navigation processor for running the software module;

wherein the Kalman filter is configured to calibrate the inertial measurement unit in the first orientation and the second orientation and to correct output from the navigation module based on estimates of a bias in the inertial measurement unit.

13. The inertial navigation system of claim 12, wherein the inertial measurement unit comprises:

a horizontal-sensing gyroscope, wherein the Kalman filter estimates a horizontal axis tilt error of the horizontal-sensing gyroscope when the inertial measurement unit is in a first orientation;

a horizontal-sensing accelerometer communicatively coupled to the Kalman filter, wherein the Kalman filter estimates a horizontal velocity error of the horizontal-sensing accelerometer when the inertial measurement unit is in the first orientation;

a vertical-sensing gyroscope communicatively coupled to the Kalman filter, wherein the Kalman filter estimates a horizontal axis tilt error of the vertical-sensing gyroscope when the inertial measurement unit is in a second orientation; and a vertical-sensing accelerometer communicatively coupled to the Kalman filter, wherein the Kalman filter estimates a horizontal velocity error of the vertical-sensing accelerometer when the inertial measurement unit is in the second orientation.

14. The inertial navigation system of claim 13, wherein the horizontal-sensing gyroscope is a first-horizontal-sensing gyroscope and the horizontal-sensing accelerometer is a first horizontal-sensing accelerometer, and wherein the inertial measurement unit further comprises:

a second-horizontal-sensing gyroscope, wherein the Kalman filter estimates a horizontal axis tilt error of the second-horizontal-sensing gyroscope when the inertial measurement unit is in the first orientation and the second orientation; and a second-horizontal-sensing accelerometer communicatively coupled to the Kalman filter, wherein the Kalman filter estimates a horizontal velocity error of the second-horizontal-sensing accelerometer when the inertial measurement unit is in the first orientation and the second orientation.

15. The inertial navigation system of claim 12, wherein the velocity sensor is a horizontal velocity sensor operable to measure a horizontal velocity and the position sensor is a horizontal position sensor operable to measure a horizontal position.

16. The inertial navigation system of claim 12, wherein the rotational device is configured to rotate the inertial measurement unit by ninety degrees from a first orientation to a second orientation.

17. The inertial navigation system of claim 12, wherein the navigation module is in a strapdown navigator.

18. The inertial navigation system of claim 12, wherein the software module further comprises a sensor compensator.

19. The inertial navigation system of claim 12, further comprising:

a servomotor mechanically coupled to the rotational device.

20. The inertial navigation system of claim 12, wherein the servomotor is mechanically coupled to the rotational device by a precision gear head.

* * * * *